United States Patent
Tölle et al.

(10) Patent No.: US 7,569,954 B2
(45) Date of Patent: Aug. 4, 2009

(54) REDUNDANT COOLING SYSTEM WITH TWO COOLING CIRCUITS FOR AN ELECTRIC MOTOR

(75) Inventors: Hans-Jürgen Tölle, Nürnberg (DE); Reinhard Vogel, Herzogenaurach (DE); Peter Wengler, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 292 days.

(21) Appl. No.: 10/528,342

(22) PCT Filed: Sep. 8, 2003

(86) PCT No.: PCT/DE03/02978

§ 371 (c)(1),
(2), (4) Date: Oct. 28, 2005

(87) PCT Pub. No.: WO2004/030182

PCT Pub. Date: Apr. 8, 2004

(65) Prior Publication Data

US 2006/0125332 A1 Jun. 15, 2006

(30) Foreign Application Priority Data

Sep. 20, 2002 (DE) ................ 102 43 775

(51) Int. Cl.
*H02K 9/00* (2006.01)
*H02K 9/20* (2006.01)
(52) U.S. Cl. .............. 310/54; 310/52; 310/57; 310/58; 310/59; 440/88 C; 440/88 HE; 440/88 P; 114/334
(58) Field of Classification Search .......... 310/52, 310/54, 53, 57–59; 440/88 C, 88 HE, 88 P; 114/334; *H02K 9/00, 9/20*
See application file for complete search history.

(56) References Cited

U.S. PATENT DOCUMENTS

| | | | | |
|---|---|---|---|---|
| 2,019,025 A | * | 10/1935 | Spear et al. | 114/337 |
| 2,019,026 A | * | 10/1935 | Spear et al. | 290/1 B |
| 2,327,786 A | * | 8/1943 | Heintz | 310/54 |
| 2,986,905 A | * | 6/1961 | Grant et al. | 62/475 |

(Continued)

FOREIGN PATENT DOCUMENTS

DE 39 25 337 A1 2/1991

(Continued)

OTHER PUBLICATIONS

Heine et al: "Four-Circuitdc Motor for Submarine Propulsion" Siemens Power Engineering & Automation, Siemens AG. Berlin, DE, vol. 7, No. 2, Mar. 1985.*

(Continued)

*Primary Examiner*—Quyen Leung
*Assistant Examiner*—Naishadh N Desai
(74) *Attorney, Agent, or Firm*—Harness, Dickey & Pierce, P.L.C.

(57) ABSTRACT

A redundant cooling device, for an electrical submarine drive motor, includes a first cooling circuit and a second cooling circuit, by which thermal energy may be removed from the electric submarine drive motor. A high degree of operational security and redundancy may be provided, whereby the coolant in the first cooling circuit and the second cooling circuit flow counter-currently through a stator cooling circuit in the region of the electrical submarine drive motor.

20 Claims, 1 Drawing Sheet

U.S. PATENT DOCUMENTS

| | | | | |
|---|---|---|---|---|
| 3,089,969 | A * | 5/1963 | Wiedemann | 310/53 |
| 3,145,916 | A * | 8/1964 | Leven | 417/372 |
| 3,318,253 | A * | 5/1967 | Campolong | 417/367 |
| 3,755,702 | A * | 8/1973 | Willyoung | 310/53 |
| 3,805,101 | A * | 4/1974 | Purman | 310/54 |
| 3,936,681 | A * | 2/1976 | Liebe | 310/54 |
| 4,313,309 | A * | 2/1982 | Lehman, Jr. | 62/175 |
| 4,728,840 | A * | 3/1988 | Newhouse | 310/113 |
| 4,766,557 | A * | 8/1988 | Twerdochlib | 702/51 |
| 4,845,394 | A | 7/1989 | Kleinhans | |
| 5,078,628 | A * | 1/1992 | Garis, Jr. | 440/6 |
| 5,101,128 | A * | 3/1992 | Veronesi et al. | 310/54 |
| 5,196,746 | A * | 3/1993 | McCabria | 310/54 |
| 5,229,677 | A * | 7/1993 | Dade et al. | 310/268 |
| 5,271,248 | A * | 12/1993 | Crowe | 62/505 |
| 5,438,226 | A * | 8/1995 | Kuchta | 307/125 |
| 5,509,830 | A * | 4/1996 | Garis, Jr. | 440/6 |
| 5,537,956 | A * | 7/1996 | Rennfeld et al. | 123/41.29 |
| 5,592,039 | A * | 1/1997 | Guardiani | 310/113 |
| 5,599,215 | A * | 2/1997 | Jarvinen | 440/6 |
| 5,647,218 | A * | 7/1997 | Kuriyama et al. | 62/6 |
| 5,664,916 | A * | 9/1997 | Link et al. | 409/135 |
| 6,405,554 | B1 * | 6/2002 | Kawakatu et al. | 62/335 |
| 6,442,949 | B1 * | 9/2002 | Laskaris et al. | 62/51.1 |
| 6,596,175 | B2 * | 7/2003 | Rowe | 210/696 |
| 6,837,757 | B2 * | 1/2005 | Van Dine et al. | 440/6 |
| 6,895,773 | B2 * | 5/2005 | Amaral | 62/324.1 |
| 6,901,765 | B2 * | 6/2005 | Amaral et al. | 62/239 |
| 6,994,602 | B2 * | 2/2006 | Ries | 440/6 |
| 7,026,738 | B1 * | 4/2006 | Lynch et al. | 310/178 |
| 7,064,463 | B2 * | 6/2006 | Matin et al. | 310/52 |
| 7,186,156 | B2 * | 3/2007 | Le Flem et al. | 440/6 |
| 2003/0141769 | A1 | 7/2003 | Kubo | |
| 2005/0009418 | A1 * | 1/2005 | Ries et al. | 440/6 |
| 2005/0012409 | A1 * | 1/2005 | Philippart | 310/54 |

FOREIGN PATENT DOCUMENTS

| | | |
|---|---|---|
| DE | 298 21 326 U1 | 12/1999 |
| DE | 100 00 578 A1 | 7/2001 |
| EP | 0 533 359 A2 | 8/1992 |
| GB | 2 162 377 A | 6/1984 |
| JP | 11 041860 A | 2/1999 |
| JP | 2000 175434 A | 6/2000 |
| WO | WO 92/19851 | 11/1992 |
| WO | WO 03/043104 A2 | 5/2003 |

OTHER PUBLICATIONS

Wolfgang Heine et al., "Four-Circuit DC Motor for Submarine Propulsion", Siemens Power Engineering & Automation, Semens AG. Berlin, DE, vol. 7, No. 2, Mar. 1985, pp. 97-101.

International Search Report, International Preliminary Examination Report and German Translation Aid, Sep. 17, 2007.

* cited by examiner

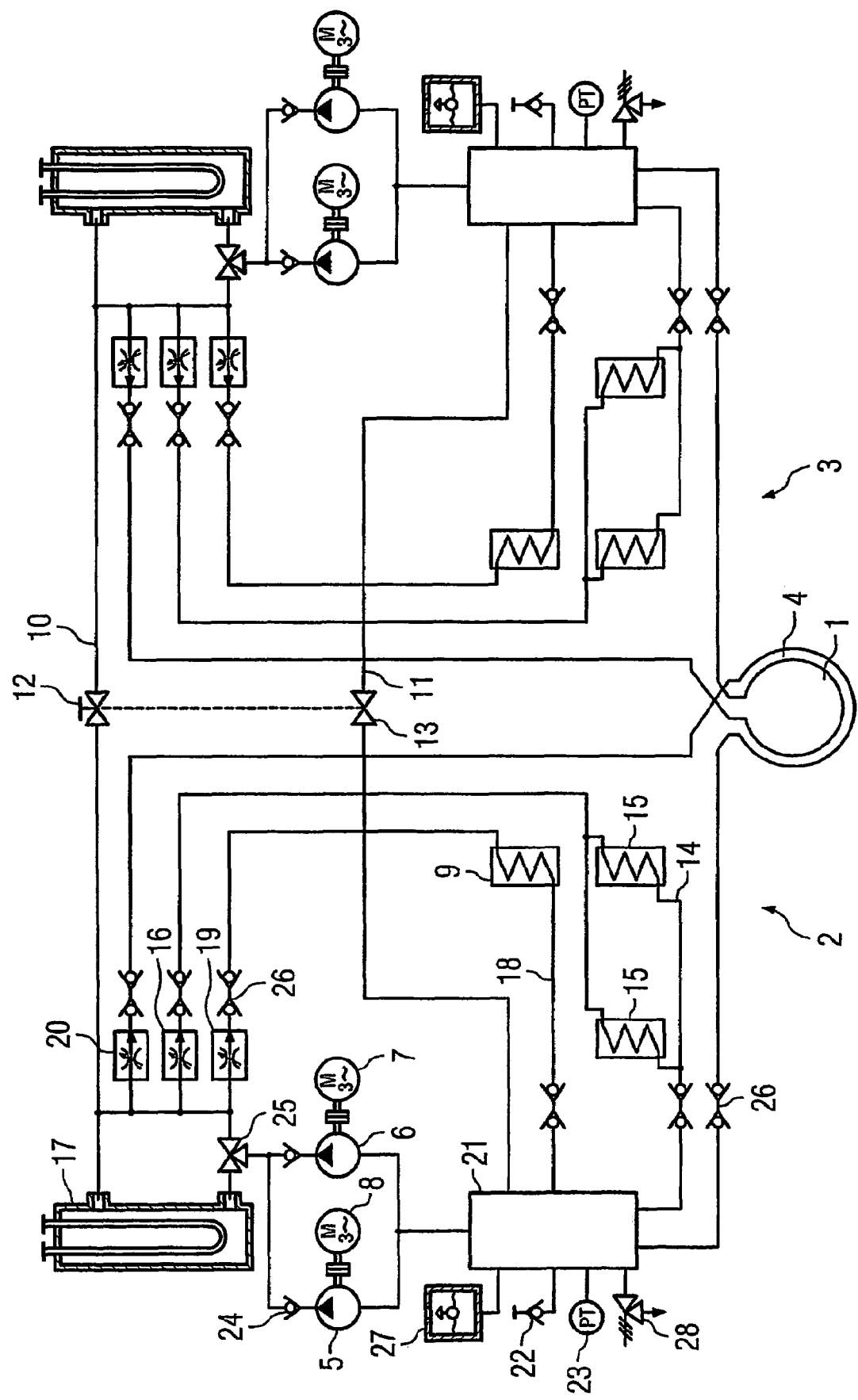

REDUNDANT COOLING SYSTEM WITH TWO COOLING CIRCUITS FOR AN ELECTRIC MOTOR

This application is the national phase under 35 U.S.C. § 371 of PCT International Application No. PCT/DE2003/002978 which has an International filing date of Sep. 8, 2003, which designated the United States of America and which claims priority on German Patent Application number DE 102 43 775.0 filed Sep. 20, 2002, the entire contents of which are hereby incorporated herein by reference.

FIELD OF THE INVENTION

The invention generally relates to a redundant cooling device for an electric liquid-cooled submarine drive motor. Preferably, it relates to one with a first cooling circuit and a second cooling circuit, by which thermal energy can be transported away from the electric submarine drive motor.

SUMMARY OF THE INVENTION

An embodiment of the invention includes an object of providing a redundant cooling device of high capacity for an electric submarine drive motor, it being intended with the amount of heat that is to be removed to use adapted coolant flows to provide a high degree of operational reliability and redundancy.

An object may be achieved according to an embodiment of the invention by the first cooling circuit and the second cooling circuit of the redundant cooling device being designed in the region of the electric submarine drive motor in such a way that the coolant of the first cooling circuit and the coolant of the second cooling circuit flow in opposite directions through a stator cooling ring in which the cooling circuits are arranged. This counter-current flow of the two cooling circuits in the region of the submarine drive motor has the effect that heat is dissipated from it much more uniformly than is possible with cooling devices known from the prior art.

To advantageously satisfy the requirements in terms of operating conditions imposed on an electric submarine drive motor with regard to the different power output, each cooling circuit may be assigned a main pump and a minor pump with considerably lower power in comparison with the main pump. The main pump and the minor pump of each cooling circuit advantageously may have supply voltages that are independent from each other.

Correspondingly, to increase the efficiency of the overall drive system, each circuit can be operated in a low speed range of the electric submarine drive motor exclusively by use of the minor pump assigned to it. Further, it can be operated in a speed range above the low speed range of the electric submarine drive motor exclusively by use of the main pump assigned to it.

If transfer lines in which a coupling valve is respectively arranged are provided between the two redundant cooling circuits, the coupling valves can be connected through in the event of failure of a cooling circuit, for example because of failure of the pumps or pump motors. It is then possible for the circulation of the coolant of both cooling circuits to be accomplished by the pumps that are still working.

Since in this case only reduced pumping capacity with a correspondingly reduced current flow is available, the output power of the electric submarine drive motor should expediently be adaptable to the amount of heat which can then be removed.

The redundant pump units, heat exchangers, fittings, valves, etc. belonging to the redundant cooling device are expediently arranged on the upper part of the electric submarine drive motor.

According to an advantageous embodiment of the redundant cooling device according to the invention, each of the two cooling circuits also may have a cooling branch by which inverter modules assigned to the submarine drive motor can be cooled.

In both cooling circuits, the coolant may be provided in the form of fresh water to which there may be added an anticorrosive agent, and possibly further additives for biologically and chemically stabilizing the water, and which can be re-cooled with respect to each cooling water circuit by way of sea water in a water-water heat exchanger or in a water-air heat exchanger.

The controlling and switching of the main and minor pumps of each cooling circuit expediently takes place by way of a power supplying and switching unit, the dedicated cooling plates of which can likewise be cooled by way of a further cooling branch of each cooling circuit.

According to an advantageous embodiment of the redundant cooling device according to the invention, the motors of the two minor pumps may be operated with a fixed supply frequency and/or supply voltage.

According to a further advantageous embodiment of the redundant cooling device according to the invention, the main pump of each cooling circuit may be supplied via inverters, in order to adapt the delivery rate of the cooling liquid, and with it the amount of heat to be removed, via the variable speed of the motors. The motors of the main pumps may be operated in such a way that their speed and power can be adapted to the amount of heat to be removed.

The use of three-phase squirrel-cage asynchronous motors provides advantageous solutions. The speed and power adaptation of the asynchronous motors with squirrel-cage rotors can take place in an advantageous way by varying the supply frequency and/or the supply voltage and/or by using pole-changing motors.

An independent supply voltage is advantageously provided for each of the main and minor pumps.

Each cooling circuit is expediently equipped with an expansion vessel for the cooling liquid, a device for degassing the cooling liquid, a service connection and advantageously a pressure-relief valve.

Temperature sensors are advantageously arranged in each of the two cooling circuits for controlling the pump output.

To ensure that the components to be cooled are supplied with the appropriate amount of coolant, a pressure-independent flow governor is advantageously arranged in each of the two cooling circuits upstream of the stator cooling ring, inverter modules and the power supplying and switching unit.

According to a further advantageous embodiment of the redundant cooling device according to the invention, a temperature-controlled three-way valve is present in each of the two cooling circuits.

In addition, it is expedient if a nonreturn valve is respectively provided in the pressure side of the minor pumps and the main pumps.

Furthermore, in an advantageous development of the redundant cooling device according to an embodiment of the invention, quick-action couplings that shut off in both directions are arranged in the connecting lines between the redundant cooling device and the submarine drive motor.

BRIEF DESCRIPTION OF THE DRAWINGS

The invention is explained in more detail below on the basis of an embodiment with reference to the drawings, in the single FIGURE of which an exemplary embodiment of a redundant cooling device according to the invention is represented in principle.

An embodiment of a redundant cooling device according to the invention shown in the single FIGURE serves the purpose of cooling a submarine drive motor 1.

DETAILED DESCRIPTION OF THE EXEMPLARY EMBODIMENTS

For this purpose, the redundant cooling device has two cooling circuits 2, 3, which are independent from each other and of which the first cooling circuit 2 is represented on the left of the submarine drive motor 1 and the second cooling circuit 3 is represented on the right of the submarine drive motor 1 in the single FIGURE.

The first cooling circuit 2 flows clockwise through the stator cooling ring 4 of the submarine drive motor 1 in the exemplary embodiment shown in the FIGURE, whereas the second cooling circuit 3 flows counterclockwise through the stator cooling ring 4 of the submarine drive motor 1.

Otherwise, the two cooling circuits 2 and 3 correspond with regard to their configuration, so that only the first cooling circuit 2 will be explained in more detail below with regard to its individual components, etc. The second cooling circuit 3 is constructed in a corresponding way, its functions also being correspondingly configured.

The first cooling circuit 2 has a main pump 5 and a minor pump 6, the output of which is significantly less in comparison with the main pump 5.

By use of the minor pump 6, the coolant circulation can be accomplished in a part-load range of the submarine drive motor 1. The main pump 5 of the first cooling circuit 2 remains switched off at that time.

In the exemplary embodiment represented, the main pump 5 of the first cooling circuit 2 is operating above the part-load range of the submarine drive motor 1. The minor pump 6 can be switched off at this time. Motors 7 and 8 of the minor and main pumps 6 and 5, respectively, are designed in the exemplary embodiment represented as asynchronous motors with squirrel-cage rotors. The two motors 7, 8 of the minor pump 6 and main pump 5 of the first cooling circuit 2 are assigned a power supplying and switching unit 9, the electrical part of which is not represented in the single FIGURE and can be varied according to demand by means of the supply frequency and/or the supply voltage.

For the motors 8 of the main pumps 5 and the motors 7 of the minor pumps 6 of the two cooling circuits 2, 3, an independent supply voltage is respectively provided.

Between the two redundant cooling circuits 2, 3, two interconnected transfer lines 10, 11 are provided. Respectively arranged in these two transfer lines 10, 11 is a coupling valve 12 and 13, the switching-over of which can take place by way of a common hand lever. When the coupling valves 12, 13 are open, it is possible to operate the two cooling circuits 2, 3 by use of a single main pump, for example by use of the main pump 5. Thus, the coolant circulation can be maintained in both cooling circuits 2, 3 by use of a single main pump 5. In this operating state, only a smaller total amount of coolant can be circulated on the submarine drive motor 1, so that the power of the submarine drive motor 1 is to be reduced in a way corresponding to the amount of heat that can then be removed.

In both cooling circuits 2, 3, the re-cooling of the coolant takes place in each case by means of a water-water heat exchanger 17, in which the coolant of the cooling circuits 2, 3 is re-cooled by use of sea water.

The two water-water heat exchangers 17 as well as the two main pumps 5 and the two minor pumps 6, expansion vessels 21, pressure-independent flow governors 16, 19, 20 and all the required fittings of the two cooling circuits 2, 3 are constructed on the submarine drive motor 1.

The cooling circuits 2, 3 each have a cooling branch 14, by which inverter modules 15 arranged in it can be cooled. Arranged upstream of the inverter modules 15 in this cooling branch 14 is the pressure-independent flow governor 16.

The power supplying and switching unit 9 of each cooling circuit 2, 3 is arranged in a further cooling branch 18 of the first cooling circuit 2 and the second cooling circuit 3, respectively, the further pressure-independent flow governor 19 being arranged upstream of the power supplying and switching unit 9 in this further cooling branch 18.

In addition, in each of the two cooling circuits 2, 3, the further pressure-independent flow governor 20 is provided upstream of the stator cooling ring 4 of the submarine drive motor 1.

Present in each of the cooling circuits 2, 3 is the expansion vessel 21, in which the cooling liquid can expand and degas via a degassing device 27.

On this expansion vessel 21 there is also a service connection 22, for example for filling the cooling circuits 2, 3.

To protect the cooling circuits 2, 3, a pressure-relief valve 28 is present in each of the cooling circuits 2, 3.

In addition, a temperature sensor 23 is installed in the expansion vessel 21 for the temperature-dependent control of the minor pumps 6 and main pumps 5.

Since, when respectively operating only one main pump 5 or one minor pump 6 in the cooling circuits 2, 3, return of the coolant flows via the main pump 5 or minor pump 6 that is not in operation must be prevented, corresponding nonreturn valves 24 are respectively installed in the pressure lines downstream of the main pump 5 and minor pump 6.

In order to prevent condensation inside the submarine drive motor 1 during its operation, the re-cooling of the cooling liquid by means of sea water via the water-water heat exchanger 17 is controlled by means of a temperature-controlled three-way valve 25.

In order to facilitate ease of maintenance and accessibility to the submarine drive motor 1, all the connections between the components of the redundant cooling device on the upper part of the submarine drive motor 1 and the submarine drive motor 1 are provided with quick-action couplings 26 which automatically shut off on both sides.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A redundant cooling device for an electric submarine drive motor, comprising:
a first liquid cooling circuit and a second liquid cooling circuit being functionally independent of each other and adapted to transport thermal energy away from the electric submarine drive motor, wherein the first liquid cooling circuit and the second liquid cooling circuit are adapted to flow a liquid coolant in a counter-current through a stator cooling ring of the electric submarine drive motor, in a region of the electric submarine drive motor, and wherein a main pump and a minor pump, the minor pump being a lower power pump than the main pump, are arranged in each cooling circuit and are functionally independent of each other, and the main pump and the minor pump of each cooling circuit include supply voltages that are functionally independent of each other.

2. The redundant cooling device as claimed in claim 1, wherein each cooling circuit is operatable in a low speed range of the electric submarine drive motor, exclusively by use of the minor pump assigned thereto.

3. The redundant cooling device as claimed in claim 2, wherein each cooling circuit is operatable above a low speed range of the electric submarine drive motor, by use of the main pump assigned thereto.

4. The redundant cooling device as claimed in claim 1, wherein a coupling valve is respectively arranged in transfer lines provided between the two redundant cooling circuits.

5. The redundant cooling device as claimed in claim 4, wherein the coolant circulation of the two cooling circuits connected to each other when the coupling valves are open is accomplished by use of one of the two main pumps, the output power of the electric submarine drive motor being adaptable to the amount of heat which is then removable.

6. A redundant cooling device for an electric submarine drive motor, comprising:
a first liquid cooling circuit and a second liquid cooling circuit being functionally independent of each other and adapted to transport thermal energy away from the electric submarine drive motor, wherein the first liquid cooling circuit and the second liquid cooling circuit are adapted to flow a liquid coolant in a counter-current through a stator cooling ring of the electric submarine drive motor, in a region of the electric submarine drive motor, and wherein a main pump and a minor pump, the minor pump being a lower power pump than the main pump, are arranged in each cooling circuit and are functionally independent of each other, and the main pump and the minor pump of each cooling circuit include supply voltages that are independent of each other, wherein the redundant pump units, heat exchangers, fittings, and valves are arranged on the upper part of the electric submarine drive motor and the two cooling circuits each have a cooling branch, by which inverter modules assigned to the submarine drive motor are coolable.

7. The redundant cooling device as claimed in claim 1, wherein the coolant in the two cooling circuits is re-coolable by use of sea water in a water-water heat exchanger or water-air heat exchanger.

8. The redundant cooling device as claimed in claim 1, wherein the main pump and the minor pump of each cooling circuit is assigned a power supplying and a switching unit, dedicated cooling plates of the power supplying and switching unit being cooled by use of a further cooling branch of each cooling circuit.

9. The redundant cooling device as claimed in claim 1, wherein the motors of the two minor pumps of each cooling circuit are operated with at least one of a fixed supply voltage and supply frequency.

10. The redundant cooling device as claimed in claim 1, wherein the main pumps of each cooling circuit are supplied via inverters, in order to adapt the delivery rate of the cooling liquid, and with it the amount of heat to be removed, via variable speed of the motors.

11. The redundant cooling device as claimed in claim 1, wherein the motors of the two main pumps are formed as squirrel-cage three-phase asynchronous motors.

12. The redundant cooling device as claimed in claim 1, wherein each cooling circuit includes an expansion vessel for the cooling liquid.

13. The redundant cooling device as claimed in claim 1, wherein each cooling circuit has a degassing device and a service connection for the cooling liquid.

14. The redundant cooling device as claimed in claim 1, wherein each cooling circuit has a pressure-relief valve.

15. The redundant cooling device as claimed in claim 1, wherein a temperature sensor is arranged in each of the two cooling circuits.

16. The redundant cooling device as claimed in claim 8, wherein a pressure-independent flow governor is respectively arranged in each of the two cooling circuits upstream of the stator cooling ring, upstream of the inverter modules and upstream of the power supplying and switching unit.

17. The redundant cooling device as claimed in claim 1, wherein a temperature-controlled three-way valve is present in each of the two cooling circuits.

18. The redundant cooling device as claimed in claim 1, wherein a nonreturn valve is respectively present in a pressure side of the minor pumps and the main pumps.

19. The redundant cooling device as claimed in claim 1, wherein quick-action couplings that shut off in both directions are arranged in the connecting elements between the redundant cooling device and the submarine drive motor.

20. The redundant cooling device as claimed in claim 1, wherein the first cooling circuit and the second cooling circuit are identical cooling loops and have a same cooling capacity.

* * * * *